G. G. NOAH.

Apparatus for Making Paste.

No. 138,519.   Patented May 6, 1873.

UNITED STATES PATENT OFFICE.

GEORGE G. NOAH, OF CHARLESTOWN, MASSACHUSETTS.

IMPROVEMENT IN APPARATUS FOR MAKING PASTE.

Specification forming part of Letters Patent No. 138,519, dated May 6, 1873; application filed October 31, 1872.

*To all whom it may concern:*

Be it known that I, GEORGE G. NOAH, of Charlestown, in the county of Middlesex, in the State of Massachusetts, have invented a new and useful Improvement in Machines for Making or Cooking Paste; and I do hereby declare that the following is a description thereof, reference being had to the accompanying drawing and to the letters of reference marked thereon.

The nature of my invention consists in a cylindrical open vat or vessel, an agitator arranged therein, a surrounding case or vessel, a closed space between the two vessels and extending around the inner one, an induction-passage leading from such space into the inner vessel, and a valve to close or open such passage, all being combined and arranged as hereinafter described and as represented.

I have heretofore patented a machine for cooking paste at the same time that its ingredients are being thoroughly mixed together; but in that machine (see Letters Patent No. 73,115) the paste is cooked by the steam being projected into it through the arms of the agitator at or about the period while such paste is being thoroughly stirred; but my present invention differs substantially from that, inasmuch as the agitator has no steam-passages in or through it, and the paste tub or vat containing such agitator is surrounded by a steam receiving vessel or chamber provided with an aperture from it into the paste vessel, and a valve to such opening, whereby the paste may be cooked by heat of the steam, and supplied with steam directly, as may be necessary, while the paste is being thoroughly stirred together.

To enable others skilled in the art to make and use my invention, I will now proceed to describe its construction and operation.

Figure 1:
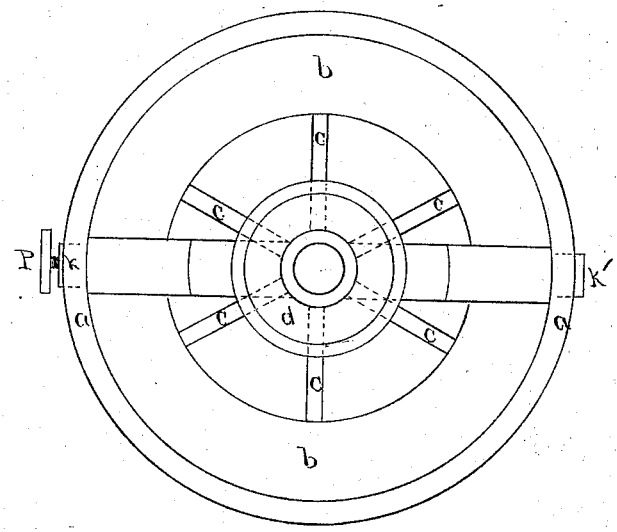
Figure 2:
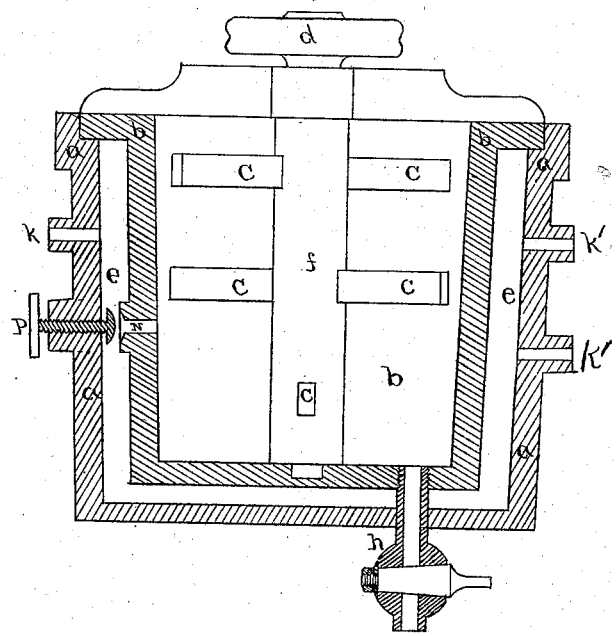

Figure 1 is a plan of the machine or apparatus. Fig. 2 is a vertical section of it.

In such drawing, $a$ is an outer tub or vessel surrounding an inner tub or vessel, $b$. Such vessels may be made of any requisite size, and of any suitable material. The inner tub or vessel is to hold the paste. The agitator is composed of a series of arms, $c$, and a shaft, $f$, such arms being projected radially from the shaft, all being arranged as shown, and being for the purpose of mixing the paste. $d$ is a pulley attached to the top or upper part of the shaft, for the purpose of revolving the shaft by a band from a suitable motor. E is the space between the inner and outer tubs or vessels, and concentric therewith, which space, when the machine is in operation, is to be filled with steam or boiling-hot water, for the purpose of cooking the paste in the inner tub or vessel while the paste is being thoroughly mixed together by the agitator. $h$ is a faucet for discharging the paste from the inner tub or vessel. K' K' are inducts for steam or hot water to enter the space between the inner and outer tubs or vessels. K is the safety-educt to let off the waste steam when there is too high pressure of steam in the space $e\ e$. N is the induction-passage, to let the steam or hot water into the inner tub or vessel for the purpose of cooking the paste or supplying it with water, as may be desired, instead of cooking it by letting steam or hot water into and through the agitator. In this machine boiling-hot water may be substituted for steam in cooking the paste. P is the valve for closing the induct N, so as to prevent the steam or hot water from entering the inner tub or vessel and the inducting-pipe N, or letting a quantity into such vessel, as may be desired, in order to cook the paste.

Thus it will be seen that the shaft, once set in motion, with the steam or hot water let on, the whole mass in the inner tub or vessel may be boiled or cooked at the same time that it is being thoroughly mixed or agitated by the agitator.

Having thus described the construction and operation of my machine, what I claim as new, and desire to secure by Letters Patent, is—

The paste-cooking machine, substantially as described, consisting of the agitator C, the vessels or tubs $a\ b$ with the closed space $e$ between them, and provided with the induct N and valve P, or such and the faucet $h$, all arranged in manner as represented, and to operate as and for the purpose set forth.

GEORGE G. NOAH.

Witnesses:
B. C. MOULTON,
A. H. SKILTON.